Figure 7:
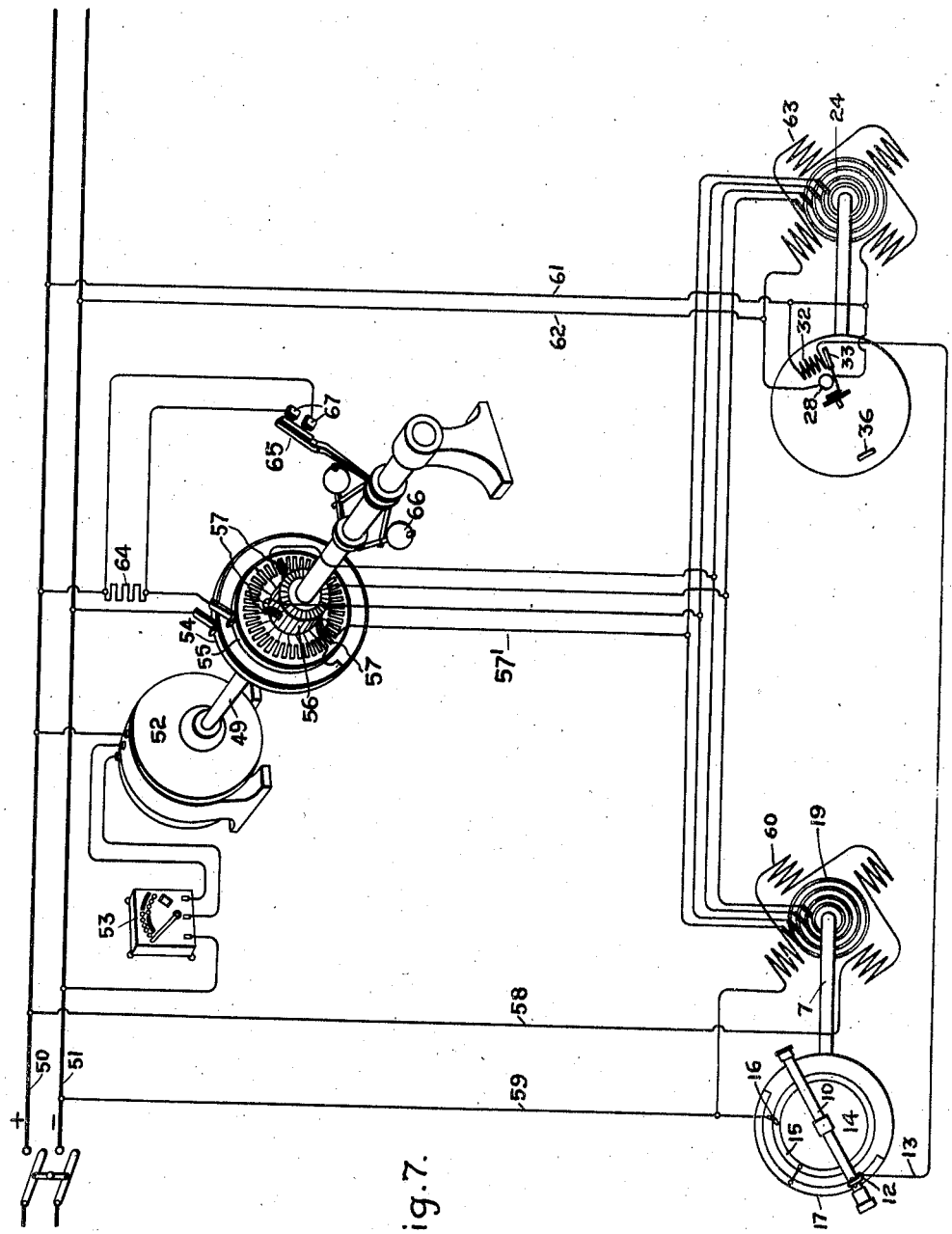

No. 818,244. PATENTED APR. 17, 1906.
J. L. HALL.
SIGNALING SYSTEM.
APPLICATION FILED SEPT. 15, 1904.
2 SHEETS—SHEET 1.
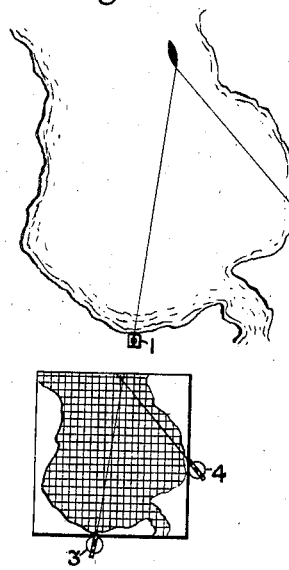
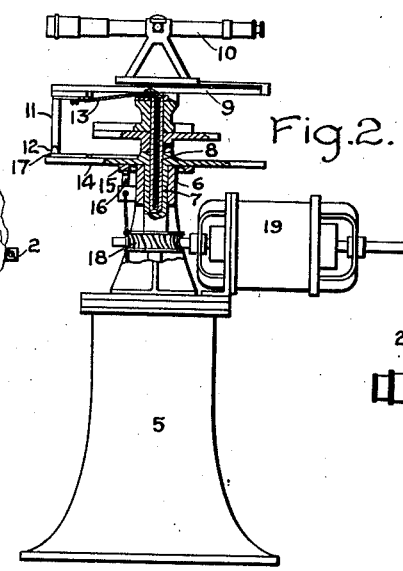
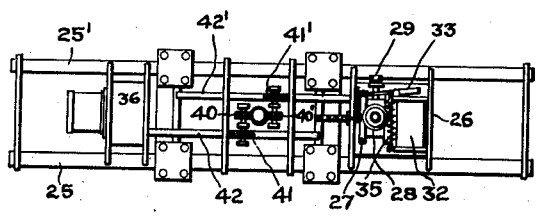
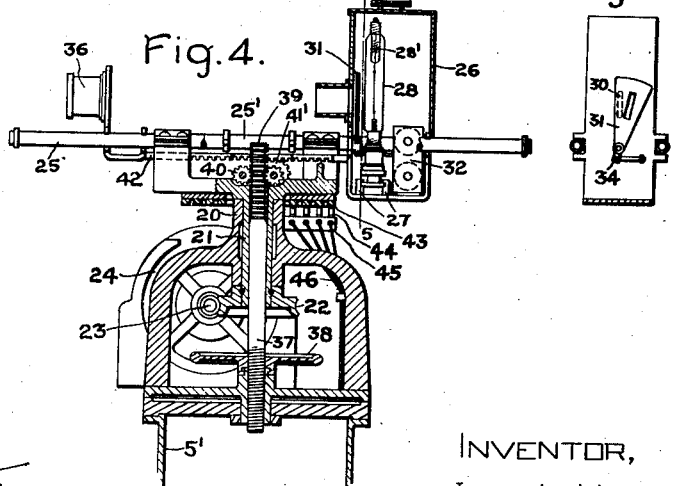
WITNESSES:
Irving E. Steers.
Helen Crawford
INVENTOR,
JOHN L. HALL.
BY Albert B. Davis
ATT'Y.

No. 818,244. PATENTED APR. 17, 1906.
J. L. HALL.
SIGNALING SYSTEM.
APPLICATION FILED SEPT. 15, 1904.

2 SHEETS—SHEET 2.

WITNESSES:
Irving E. Steers.
Helen Oxford

INVENTOR,
JOHN L. HALL,
BY Albert G. Davis
ATT'Y.

UNITED STATES PATENT OFFICE.

JOHN L. HALL, OF SCHENECTADY, NEW YORK, ASSIGNOR TO GENERAL ELECTRIC COMPANY, A CORPORATION OF NEW YORK.

SIGNALING SYSTEM.

No. 818,244.               Specification of Letters Patent.               Patented April 17, 1906.

Application filed September 15, 1904. Serial No. 224,555.

*To all whom it may concern:*

Be it known that I, JOHN L. HALL, a citizen of the United States, residing at Schenectady, in the county of Schenectady and State of New York, have invented certain new and useful Improvements in Signaling Systems, of which the following is a specification.

This invention relates to signal systems, and more particularly to that class of signaling devices known as "range-finders," and is particularly useful in military and naval operations for giving an accurate and practically continuous indication of the position of a moving object.

The invention consists of the combination of two or more transmitting instruments suitably mounted to command the field of operations and receiving instruments corresponding to the transmitting instruments mounted to command a chart of the field in the same relation thereto as the transmitting instruments are to the field itself. Each transmitter is provided with an observing instrument delicately constructed to permit it to be accurately trained on the objective and with a rotatable member driven by a suitable motor, and the receiver corresponding thereto is rotated in synchronism with the rotatable member of the transmitter and in the same angular relation to the field shown on the chart as the rotatable member is to the actual field. Once in each revolution of the rotating member of the transmitter an electric circuit is closed, the instant of closure depending on the exact position of the observing instrument, and the closure of this circuit causes the receiver to give instantaneously an indication on the chart corresponding in direction to the position of the observing instrument. The indication is preferably given by flashing a line of light across the chart, and as two pairs of instruments are operated together the intersection of the lines of light gives the position of the objective. The instruments are rotated rapidly, so that the flashes occur at very brief intervals, thus making the indications practically continuous. The position of a moving objective can thus be accurately followed on the chart. If desired, the chart may be subdivided into squares or rectangles of relatively small dimensions and the position of torpedoes, mines, and the like shown thereon to enable the operators to make readings rapidly and with great accuracy or to fire a mine when a vessel is shown to be over it.

To rotate the receiver and the rotatable member of the transmitter synchronously, I employ synchronous electric motors. Obviously in a system of this kind it is essential that the two rotatable members of a set not only be rotated in synchronism, but also that their angular relation must always be the same—that is, the motors driving these parts must start together, run in synchronism, and stop together. If the alternating-current armature-circuit of the two synchronous motors were closed by the closure of a line-switch or by means of a suitable compensator to bring the motors up to speed as induction-motors and the connections were then changed to the usual connections for synchronous motors, the motor-armatures, and hence the rotatable parts driven thereby, would rotate in synchronism; but one of the rotatable parts might be angularly displaced relatively to the other, as one motor might start before the other, and there might be more slip in one motor than in the other while running as induction-motors. Again, if an alternating-current generator were used to supply the current for the armatures of the synchronous motors and this generator were brought up to speed gradually by a suitable motor to increase the frequency gradually until normal frequency were reached, and thus bring the motors up to speed, the current from the generator when first started would be so small that one motor would be apt to start before the other, and the rotatable members would be angularly displaced, as before.

In order to properly start the motors and bring them up to speed together to maintain the desired angular relation between the rotatable members of the transmitter and receiver driven thereby, I have provided an inverted rectifier, consisting of a commutator the segments of which are connected by resistances connected to mains from a source of direct-current supply and arrange brushes bearing on this commutator and connected to the collector-rings for the armatures of the synchronous motors. These brushes are disposed equally distant from one another about the commutator and are of such a number as will give an alternating current of the number of phases for which the synchronous motors were designed. By this means the frequency of the alternating current supplying the armatures of the synchronous motors can be gradually increased until the frequency for which the motors were designed is reached, and sufficient current is supplied by the rectifier even at the lowest frequency to insure starting the motors instantly and bringing them up to speed together to preserve the proper angular relation between the rotatable parts driven thereby.

My invention therefore consists of a signaling set comprising a transmitter and a receiver, each having a rotatable part, means for rotating said parts in synchronism and in a definite angular relation—that is to say, in similar phase—and devices whereby the transmitter causes the receiver to indicate a direction bearing a definite relation to the position of the transmitter when said devices were operated.

It further comprises a transmitter and a receiver having rotatable parts, synchronous motors for driving them, and means for supplying current to the synchronous motors to bring them up to speed and to run them when up to speed in such a manner as to always maintain a definite angular relation or phase identity between the rotatable parts of the transmitter and receiver driven thereby.

My invention further comprises other novel features which will be pointed out with particularity in the claims appended hereto.

The details of construction and the mode of operation of my improved signaling system will be better understood by reference to the following description, taken in connection with the accompanying drawings, which show the preferred embodiment of my invention.

In the drawings, Figure 1 is a view illustrating the general principles of my invention. Fig. 2 is a sectional elevation of the transmitter. Fig. 3 is a plan view of the receiver. Fig. 4 is a sectional elevation of the same. Fig. 5 is a section on line 5 5 of Fig. 4. Fig. 6 is a modified form of receiver, and Fig. 7 is a diagrammatic view showing the electrical connections.

The general principles of the signaling apparatus will be best understood from the diagram of Fig. 1, which shows a harbor on the shore of which two transmitting instruments 1 and 2 are mounted in suitable positions to have an unobstructed view of the entire harbor. These transmitters are provided with observing instruments, which may be the usual telescopes such as are employed in surveying, having cross-hairs to determine the exact line of vision and arranged to turn on both a vertical and a horizontal axis, so that they may be trained accurately on any desired object. In any suitable and protected position a table is provided, on which is a chart having the harbor drawn accurately thereon and subdivided, if desired, into squares, as shown. Receiving instruments 3 and 4 are mounted about the table, so as to bear to the harbor mapped out on the chart the same relation as the transmitting instruments 1 and 2 bear to the real harbor. The telescopes of the transmitters 1 and 2 are brought to bear on the object, and the apparatus is so constructed that the receivers, which are rotated by suitable motors, flash a line of light across the chart every time they arrive at a position parallel or having any other desired relation to their respective transmitting instruments. The intersection of these lines of light on the chart indicates the position of the object in the harbor.

The transmitter consists of a base 5, in which is formed a bearing 6 for a sleeve 7, and within this sleeve is a hollow shaft 8, carrying at its upper end the plate 9, on which is mounted an observing instrument 10, such as a telescope. The telescope is trunnioned, as shown, to permit movement on a horizontal axis, and shaft 8 is loose in sleeve 7, so that it may be turned at will on a vertical axis. The plate 9 has an arm 11 depending therefrom, on the end of which is a metallic brush 12, and a wire 13 extends up through the hollow shaft 8 and is connected to brush 12. Sleeve 7 carries a circular plate 14, on the lower side of which is a collector-ring 15, with which a brush 16, mounted on a block secured to the base 5, coöperates to carry current to plate 14 while the latter is being rotated. On the upper side of plate 14 is a conducting-segment 17, connected electrically to the collector-ring 15. The circle of segment 17 is preferably completed by a segment of fiber or other insulating material to prevent jarring the parts when brush 12 leaves segment 17. Near its lower end sleeve 7 is provided with a worm-wheel 18, with which meshes a worm on the shaft of a synchronous motor 19, suitably secured on the base 5. It will thus be seen that the plate 14 is continuously rotated by the motor 19, that the telescope and the arm 11 secured thereto can be turned by hand about vertical and horizontal axes to bring it to bear on the objective, and that the brush 12 on arm 11 sweeps over the segment 17 once in each revolution of plate 14, so that during each revolution circuit is made and broken by the brush 12, and the instant at which this circuit is closed depends wholly upon the angular position of the telescope.

The receiving instrument consists of a base 5', in the upper end of which is formed a bearing 20 for a sleeve 21. On the lower end of this sleeve is a worm-wheel 22, with which meshes a worm 23 on the shaft of a synchronous motor 24, similar to the motor 19. At its upper end the sleeve 21 supports two parallel oils 25 25', which carry the mechanism for flashing the beam of light across the chart to give the desired indication. This mechanism consists of a lamp, preferably an incandescent electric lamp, inclosed within a casing, a pivoted shutter which normally closes an opening in the casing in front of the lamp, an electromagnet for moving the shutter, and a lens for focusing the image of the lamp filament upon the chart. Slidably mounted upon the rods 25 25' is a box or casing 26, in the lower part of which are ways 27, in which the receptacle for the lamp 28 is mounted so that it may be moved back and forth by a suitable adjusting-screw 29 to accurately position it before the opening for the light-rays. As shown in Fig. 4, this lamp is provided with a straight filament. I find in practice that the limiting speed at which the receiver can be rotated and the indications given is the speed at which the filament is bowed out by centrifugal force so much as to affect the accuracy of the indication. As the length of the lamp filament increases and decreases in response to the changes of temperature when circuit through it is opened and closed, I provide a coiled spring 28', of conducting material, at one end of the filament to hold the filament taut. In the front of the casing 26 is an opening 30, (shown in dotted lines in Fig. 5,) and a shutter 31, having a corresponding opening therein, is pivoted directly below opening 30. Mounted behind the lamp in box 26 is an electromagnet 32, having a pivoted armature 33, which is pivotally connected to an extension 34 on the shutter 31. These parts are so arranged that when armature 33 of the magnet 32 is attracted the shutter 31 is turned on its pivot, so that the opening in the shutter passes across the opening 30 in the box 26. A coiled spring 35 is connected at one end to armature 33 and at the other end to a stationary post to retract the armature when the magnet is deënergized, thus carrying the shutter 31 back to the position shown in Fig. 5. A lens 36 is suitably mounted to slide back and forth on the rods 25 25' and in alinement with the opening 30 in the casing 26 and the filament of lamp 28. In order to accurately focus the rays of light on the chart, I provide means by which the lamp 28 and lens 36 may be moved toward or away from each other while the receiver is being rotated. Within the sleeve 21 is a shaft 37, extending down through an opening in the base 5' and threaded at its lower end. On this threaded end is a hand-wheel 38, held against vertical movement by a lip on the base 5', as shown. At its upper end shaft 37 is provided with a circular rack 39, with which two pinions 40 and 40', mounted on short cross-shafts, mesh. The pinions 40 and 40' are on opposite sides of rack 39, so that when shaft 37 is raised or lowered by turning the hand-wheel 38 the pinions and their shafts are rotated in opposite directions. On the shaft of each of the pinions 40 40' are small gears 41 41', which mesh with racks on the lower sides of rods 42 42', the former of which is rigidly connected to the lens 36 and the latter to the box 26. It will thus be seen that rotating the hand-wheel 38 to raise or lower shaft 37 operates, through the circular rack 39, the two pinions 40 40' and gears 41 41', and the rods 42 42', to move the lens and the lamp toward or away from each other, but that the rack 39 permits the rods 25 25' and the parts carried thereby to be rotated freely without changing the relative positions of the lens and lamp. Suitably mounted on the receiver are four collector-rings 43, with which coöperate brushes 44, mounted on a block 45, secured on the base 5'. Two of these collector-rings carry the current to and from the magnet 32 and the other two carry the current for the lamp 28. The leads 46 from the brushes 44 are carried down through the base, as shown.

In Fig. 6 I have shown a modified form of receiver which has the advantage that the parts are more compact and bowing of the lamping filament by the rotation of the receiver is avoided. In this receiver the lamp is mounted horizontally in the top of the box, and immediately below it is the lens. In the base of the box is an electromagnet mounted in an incline position, as shown, and the pivoted armature of this electromagnet carries on its upper face a mirror 47. The light-rays from lamp 28 are thrown onto the mirror and reflected thereby, and when the magnet 32 is energized the pivoted armature is attracted against the tension of its spring, thus changing the direction in which the light-rays are reflected by the mirror 47. The parts are so arranged that when the armature is held in the retracted position by its spring the light-rays are reflected above the opening in the box, and when in the attracted position they are reflected below the opening, so that the flash upon the chart is only an instantaneous one, occurring while the armature is moving to the attracted position.

As described above, the rotatable parts of the transmitter and receiver are driven by synchronous motors. When these motors are connected in the same circuit, they will of course rotate in synchronism; but in a system of the kind described it is essential that the two rotatable members be also in phase. On account of the varying slip in synchronous motors when started as induction-motors and the difficulty which would be encountered in obtaining the desired angular relation between the rotatable members if auxiliary motors were used to start the synchronous motors and bring them up to speed it is necessary that some means other than those usually employed in starting synchronous motors be provided to insure the maintenance of phase identity between the two instruments. For this purpose I provide an inverted rectifier driven by a suitable motor and supplied with current from a source of direct-current supply. This is shown in Fig. 7 of the drawings, in which 50 and 51 indicate positive and negative mains from a source of direct current, 52 a shunt-wound variable-speed direct-current motor, and 53 a regulating-rheostat in the motor-circuit for effecting the speed variations. On the shaft 49 of the motor 52 is mounted the inverted rectifier, consisting of two collector-rings 54 55, each connected to one of the mains 50 51 by a stationary brush and a commutator 56, having a plurality of segments, each connected to the adjacent segments through suitably-proportioned resistances. The two collector-rings 54 and 55 are connected to the commutator 56 at diametrically opposite points. If the synchronous motors are two-phase motors, as shown herein, four stationary brushes 57 are employed bearing on the commutator 56 and arranged to be equally distant one from another. As will be well understood by those skilled in the art, this arrangement of the parts will give a two-phase current on the four wires 57', leading from the brushes 57 to the collector-rings on the shafts of the two-phase synchronous motors 19 and 24. It is obvious, however, that a different number of brushes 57 may be disposed at equal distances apart about the commutator 56 in order to give an alternating current of a different number of phases and synchronous motors constructed to run on such a circuit employed. It will also be seen that the variable-speed motor 52 permits varying the frequency of this two-phase current as desired. From the direct-current mains 50 51 leads 58 59 are carried to the field 60 of one of the synchronous motors and leads 61 62 to the field 63 of the other motor. The lamp 28 in the receiver is connected across the leads 61 62. One side of the coil of the electromagnet 32 is connected to one of these leads, and from the other side a wire is carried to the transmitter and extends up through the hollow shaft 8 therein to the brush 12, which, as above described, bears during about one-half of a revolution on the segment 17, which is connected, through the ring 15, to the opposite side of the direct-current circuit. In starting the synchronous motors I close circuit to the fields of the synchronous motors and to the inverted rectifier, start the motor 52 slowly, and gradually increase its speed, so as to gradually increase the frequency of the alternating-current circuit leading from the inverted rectifier. When motor 52 is first started, the frequency being so low, the drop through the armatures of the synchronous motors is only that due to the resistance of the lines and conductors. When the motors are up to speed, however, and the frequency is normal, the reactance in the motor-armatures is high, due to the relatively high frequency, and adds to the resistance of the lines and conductors to cause a large drop in voltage through the motor-armatures. For this reason a voltage at the rectifier high enough to give the current necessary to run the motors when up to speed would cause the flow of a much greater current when the motors are first started and might burn out the motor-armatures. I therefore insert a resistance 64 in one of the leads to the rectifier to cut down the current while the motors are starting, and I arrange a switch 65 to cut out this resistance when the motors are up about one-half of normal speed. On the shaft 49 of the motor 52 and the rectifier is a centrifugal ball-governor 66, arranged to throw a switch-arm 65 when the motor reaches a predetermined speed to a position in which it cross-connects two stationary contacts 67, and thus short-circuits the resistance 64.

The operation of my improved signaling device as thus described is as follows: The two receiving instruments are set up in the same relation to the harbor mapped out on the chart as the transmitting instruments are to the harbor which forms the range, and the armatures of the synchronous motors for the receiver and transmitter of each set are connected to an inverted rectifier, as shown in Fig. 7. The circuit of the mains 50 51 from the source of direct-current supply is closed, thus closing circuit through the fields of the synchronous motors and through the resistance 64, the inverted rectifier, and the armatures of the synchronous motors. This also closes circuit through the lamp 28 in the receiver and when brush 12 is in contact with segment 17 through the magnet-coil 32. The arm of rheostat 53 is then moved slowly over the rheostat-contacts to start motor 52 and bring it gradually up to speed, thus gradually increasing the frequency of the armature-circuit of the synchronous motors 19 and 24. The rotation of the armatures of the motors being directly proportional to the frequency of the circuit in which they are connected, the motors 19 and 24 are brought up to speed gradually and ample current is at all times supplied to the motor-armatures. The motors therefore start together and come up to speed together, and when up to speed the rotatable parts of the transmitter and receiver of a set are rotating in synchronism and a definite angular relation between them is at all times maintained. When the motor 52 has been speeded up somewhat, the centrifugal governor 66 operates to throw the switch 65, and thus short-circuit the resistance 64, so that the full-load current is admitted to the armatures of the synchronous motors. The operator at each of the transmitting-stations 1 and 2 brings his telescope 10 to bear on the objective, and in moving the telescope to this position he moves the arm 11, which carries the contact 12. As the plate 14 on the transmitter rotates the segment 17 comes under brush 12 once in each revolution and the exact point in the revolution at which this segment comes under the brush is determined by the position of the telescope 10. Each time this occurs a circuit is closed from the main 51, through ring 15 and segment 17, through the coil 32 of the electromagnet on the receiver to the main 50, so that the instant this circuit is closed the electromagnet is energized and attracts its armature, thus moving the shutter 31 across the opening 30 in the box 26. This movement of the shutter permits a flash of light to be thrown from the lamp 28 through the opening 30 and the lens 36 onto the chart, and the angular position of this ray of light corresponds exactly to the position of the telescope. A similar flash is also given by the other receiving instrument or instruments, and the intersection of these flashes defines the position of the objective. The receivers and the plates 14 on the transmitters are rotated rapidly, so that these flashes occur at very short intervals. The indication is thus practically continuous and may be followed accurately on the chart. It is entirely immaterial whether the two flashes occur simultaneously, as successive flashes follow each other so closely that no difficulty is encountered in determining the position of the objective even when the flashes from the two receivers occur alternately. The segment 17 preferably extends over about one hundred and eighty degrees, so that the circuit of magnet 32 is broken and the magnet deënergized after the receiver has turned one-half a revolution past the position in which the flash was given. When the magnet is deënergized, the shutter 31 is retracted by spring 35 and another flash is given; but this flash is in a direction away from the chart, and therefore does not confuse the operators. The use of an incandescent lamp having a straight filament offers many advantages. The source of light is a fine line which may be positioned accurately before the opening in the casing 26, so that when the lens is properly adjusted and the shutter opened the image of the filament is flashed upon the chart in a thin sharply-defined line which is plainly visible even in daylight. By means of the hand-wheel 38 the position of the lamp and lens way be changed while the instruments are in operation in order to sharply focus the image of the filament upon the chart. The opening 30 in the box 26 is uncovered only for a minute interval, preferably about one-hundredth of a second, so that no error can arise due to the movement of the receiver while the shutter is open.

I have described my improved signaling system herein as used in connection with a horizontal base-line to indicate the position of an objective in the azimuth; but I do not wish to be understood as limited in any respect, as the principles of my invention are of broad application. Obviously angular inclination can be obtained in other than a horizontal plane. Also one transmitter and receiver indicating the azimuth may be used in combination with a similar set of devices operating in a vertical plane and using a vertical base-line, the intersection of the line indicating the azimuth and that indicating the angle of inclination giving the range and the azimuth, and thus defining the position of the objective. Again, combinations of azimuth and elevation indicators may be employed to obtain positions of the objective in two or more planes for greater accuracy. Furthermore, the construction which I have herein shown and described may be greatly modified in many ways. I consider all such modifications, however, within the spirit of my invention, and I aim to cover them in the claims appended hereto.

What I claim as new, and desire to secure by Letters Patent of the United States, is—

1. A signal system comprising a transmitter and a receiver each having a rotatable part, means for driving said parts synchronously, an observing instrument on the transmitter movable independently of the rotatable part thereof, and means on the receiver for indicating a direction bearing a definite relation to the position of said observing instrument.

2. A signal system comprising a transmitter and a receiver each having a rotatable part, means for driving said parts synchronously and in a definite angular relation, an observing instrument on the transmitter movable independently of the rotatable part thereof, and means on the receiver for indicating a direction bearing a definite relation to the position of the observing instrument.

3. A signal system comprising a transmitter and a receiver each having a rotatable part, means for driving said parts synchronously and in a definite angular relation, an observing instrument on the transmitter movable independently of the rotatable part thereof, and means on the receiver for indicating once during each revolution of the rotatable part of the receiver a direction bearing a definite relation to the position of the observing instrument.

4. A signal system comprising a transmitter and a receiver each having a rotatable part, means for rotating said parts synchronously and in a definite angular relation, and devices actuated by the transmitter for causing the receiver to indicate a direction bearing a definite relation to the position of the rotatable part of the transmitter when said devices were operated.

5. A signal system comprising a transmitter and a receiver each having a rotatable part, means for rotating said parts in synchronism and in a definite angular relation, and devices actuated by the transmitter for causing the receiver to indicate once in each revolution of the rotatable part thereof a direction bearing a definite relation to the position of the rotatable part of the transmitter when said devices were operated.

6. A signal system comprising a transmitter and a receiver each having a rotatable part, means for rotating said parts synchronously, and means carried by the rotatable part of the receiver for giving an indication of direction once in each rotation thereof.

7. A signal system comprising two transmitters and corresponding receivers each having a rotatable part, means for driving the rotatable part of each transmitter and the receiver corresponding thereto in synchronism and in a definite angular relation, and means on each transmitter for causing its receiver to indicate a direction once in each revolution thereof.

8. A signal system comprising two transmitters having parts thereon adapted to be trained on an objective, receivers corresponding to the transmitters, a chart, and means on each receiver governed by the transmitter corresponding thereto for flashing a beam of light onto said chart to indicate by the intersection of the two beams the position of the objective.

9. A signal system comprising two transmitters each provided with a movable observing instrument, receivers corresponding to the transmitters each having a movable part, means for moving said parts, a chart, and means on the movable part of each receiver governed by the transmitter corresponding to that receiver for flashing a beam of light onto the chart to give an indication.

10. A signal system comprising a transmitter and a receiver each having a rotatable part, means for driving said parts synchronously and in a definite angular relation, means on the transmitter for closing an electric circuit, and means carried by the rotatable part of the receiver and actuated on closure of said circuit to give an indication.

11. A signal system comprising a transmitter and a receiver each having a rotatable part, means for driving said parts synchronously and in a definite angular relation, means on the transmitter for closing an electric circuit, and means carried by the rotatable part of the receiver and actuated on closure of said circuit to indicate the angular position of the movable part of the transmitter when said circuit was closed.

12. A signal system comprising a transmitter and a receiver each having a rotatable part, motors for driving said parts synchronously and in a definite angular relation, a movable observing instrument on the transmitter, means dependent upon the position of said instrument for closing an electric circuit once in each revolution of the rotatable part of the transmitter, and means on the rotatable part of the receiver actuated on closure of said circuit to give an indication.

13. A signal system comprising a transmitter and a receiver each having a rotatable part, motors for driving said parts synchronously and in a definite angular relation, a movable observing instrument on the transmitter, means dependent upon the position of said instrument for closing an electric circuit once in each revolution of the rotatable part of the transmitter, and means carried by the rotatable part of the receiver and actuated on closure of said circuit to indicate the angular position of said instrument when the circuit was closed.

14. A signal system comprising a transmitter, a movable observing instrument thereon, a receiver, a rotatable part thereon, a motor driving the same, and means carried by said rotatable part of the receiver arranged to give an indication each time it arrives at a position bearing a predetermined angular relation to the position of said observing instrument.

15. A signal system comprising a transmitter and a receiver each having a rotatable part, means for rotating said parts synchronously, devices on the rotatable part of the receiver for flashing a beam of light to give a signal, and means on the transmitter governing said devices.

16. A signal system comprising a transmitter provided with a movable observing instrument adapted to be trained on an objective, a receiver corresponding to the transmitter, and means on the receiver governed by the transmitter for flashing a beam of light.

17. A signal system comprising a transmitter, a movable observing instrument thereon, a receiver, a rotatable part thereon, a motor driving the same, a lamp carried by said part, and means for causing said lamp to give an indication each time said rotatable part arrives at a position bearing a predetermined angular relation to the position of said observing instrument.

18. A signal system comprising a transmitter, a movable observing instrument thereon, a receiver, a rotatable part thereon, a motor driving the same, a casing having an opening therein on said part, a lamp within the casing, an electromagnet, means operated thereby for permitting the rays of light from said lamp to show through said opening, and means for closing the circuit of said electromagnet dependent upon the position of said observing instrument.

19. A signal system comprising a transmitter, a rotatable member on the transmitter, means for driving the same, an observing instrument on the transmitter movable independently of said rotatable member, means whereby an electric circuit is closed by the transmitter once in each revolution of said member, and a receiving instrument having parts actuated by the closure of said circuit.

20. A signal system comprising a transmitter, a rotatable member on the transmitter, a motor for driving the same, an observing instrument on the transmitter movable independently of said rotatable member, means whereby an electric circuit is closed by the transmitter once in each revolution of said member at a point in the revolution depending upon the position of the observing instrument, and a receiving instrument having parts actuated by the closure of said circuit.

21. A signal system comprising a transmitter having a movable observing instrument thereon, a brush secured to the instrument and movable therewith, a rotatable member, a motor driving the same, a conducting-piece carried by said member and adapted to be engaged by said brush, a receiver having parts electrically actuated to indicate a direction bearing a definite relation to the position of the observing instrument, and electrical connections between said parts and said brush and conducting-piece.

22. A signaling system comprising a transmitter, a rotatable member thereon, a motor driving the same, a contact carried by said member, a brush coöperating with said contact once in each revolution of said member to close a signaling-circuit, means permitting movement of said brush, and the receiver having parts actuated to give an indication when said signaling-circuit is closed.

23. A signal system comprising a transmitter having means for closing an electric circuit, a receiver, a rotatable member thereon, means for driving the same, and means carried by said rotatable member and actuated by the closure of said circuit to give an indication.

24. A signal system comprising a transmitter having means for closing an electric circuit, a receiver, a rotatable part thereon, a motor driving the same, a casing having an opening therein on said part, a lamp within the casing, an electromagnet energized on closure of said circuit, and means operated thereby for permitting the rays of light from said lamp to show through said opening.

25. A signal system comprising a transmitter having means for closing and opening a circuit, a receiver, a rotatable part thereon, a motor driving the same, a casing having an opening therein on said part, an incandescent electric lamp having a straight filament within the casing, and means controlling the admission of light from the lamp through the opening in the casing operated when said circuit is closed or opened.

26. A signal system comprising a transmitter having means for closing and opening a circuit, a receiver, a rotatable part thereon, a motor driving the same, an incandescent electric lamp carried by said part and adapted to give a signal, a spring within said lamp attached at one end to the filament to hold the same in proper relation, and means controlling the admission of light from the lamp operated when said circuit is closed or opened.

27. A signal system comprising a transmitter having means for closing and opening a circuit, a receiver, a rotatable part thereon, a motor driving the same, a casing having an opening therein carried by said part, a lamp within the casing, a shutter normally closing said opening, and an electromagnet energized when said circuit is closed for operating the shutter.

28. A signal system comprising a transmitter having means for closing and opening a circuit, a receiver, a rotatable part thereon, a motor driving the same, a casing having an opening therein on said part, a lamp within the casing, means operated when said circuit is closed or opened for permitting the rays from the lamp to show through said opening, a lens for focusing the rays of light, and means for adjusting the lens and lamp toward and away from each other.

29. A signal system comprising a transmitter, a receiver, a rotatable part thereon, a motor driving the same, a signal-lamp and a lens carried by said rotatable part, means for adjusting the lamp and lens toward and away from each other while said part is being rotated, and means on the transmitter for controlling the admission of light from the lamp on the receiver.

30. A signal system comprising a transmitter and a receiver, each having a rotatable part, and means for starting said rotatable parts from a position of rest together, bringing them up to speed together and rotating them in synchronism when up to speed to maintain a definite phase relation between them.

31. A signal system comprising a transmitter and a receiver each having a rotatable part, synchronous electric motors driving said parts, and means for bringing said motors from a position of rest up to speed together to maintain a predetermined angular relation between the rotatable parts driven by said motors.

32. A signal system comprising a transmitter and a receiver each having a rotatable part, synchronous electric motors driving said parts, means for supplying current to the armatures of said motors comprising a rectifier, connections thereto from a source of direct-current supply, and electrical connections between said rectifier and the armatures of said synchronous motors.

33. A signal system comprising a transmitter and a receiver each having a rotatable part, synchronous electric motors driving said parts, means for supplying current to the armatures of said motors comprising a rectifier, connections thereto from a source of direct-current supply, connections between the rectifier and the armatures of said motors, a resistance in one of said connections, and a switch for short-circuiting the resistance.

34. A signal system comprising in combination, a transmitter and a receiver each having a rotatable part, synchronous motors driving said parts, mains from a source of direct-current supply, a variable-speed electric motor connected thereto, a rectifier driven by said motor and connected to said direct-current mains, and connections between the rectifier and the armatures of the synchronous motors.

35. A signaling system comprising a plurality of observing instruments at different points, a miniature of the field of the observing instruments at another point, and synchronized apparatus for directing two beams of light to coördinately follow the movements of the observing instruments and locate by their point of intersection on the chart the position of an objective.

36. A signaling system comprising a plurality of observing instruments at different points, a miniature of the field of the observing instruments at another point, and synchronized apparatus for directing two planes of light to coördinately follow the movements of the observing instruments and locate by their point of intersection on the chart the position of an objective.

37. In a signaling system, the combination of a signaling device having a rotatable portion, a synchronous motor driving the same, mains supplying current to the motor, and means connected in said mains for adjusting the frequency of the alternating current supplied to said synchronous motor.

38. In a signaling system, the combination of a signaling device having a rotatable portion, a synchronous motor driving the same, and means for varying the frequency of the alternating current supplied to said synchronous motor comprising a commutator having segments connected by resistances, and brushes bearing on the commutator, said commutator and brushes being relatively movable.

In witness whereof I have hereunto set my hand this 13th day of September, 1904.

JOHN L. HALL.

Witnesses:
BENJAMIN B. HULL,
HELEN ORFORD.